US012650718B2

(12) United States Patent
Yeh et al.

(10) Patent No.:  US 12,650,718 B2
(45) Date of Patent:       Jun. 9, 2026

(54) POWER ADAPTER THAT COMBINES POWER INPUT AND COMMUNICATION INPUT

(71) Applicant: GOOGLE LLC, Mountain View, CA (US)

(72) Inventors: Chia-Hang Yeh, Campbell, CA (US); Yuan-Jen Chang, New Taipei City (TW)

(73) Assignee: Google LLC, Mountain View, CA (US)

( * ) Notice:   Subject to any disclaimer, the term of this patent is extended or adjusted under 35 U.S.C. 154(b) by 6 days.

(21) Appl. No.:    18/264,355

(22) PCT Filed:    Mar. 3, 2021

(86) PCT No.:      PCT/US2021/070222

§ 371 (c)(1),
(2) Date:       Aug. 4, 2023

(87) PCT Pub. No.: WO2022/186891

PCT Pub. Date: Sep. 9, 2022

(65)             Prior Publication Data

US 2024/0103593 A1       Mar. 28, 2024

(51) Int. Cl.
G06F 1/26           (2006.01)
H04B 3/54           (2006.01)
(52) U.S. Cl.
CPC ................. G06F 1/26 (2013.01); H04B 3/54 (2013.01)
(58) Field of Classification Search
CPC .................................... G06F 1/26; H04B 3/54
(Continued)

(56)             References Cited

U.S. PATENT DOCUMENTS 5,392,148 A * 2/1995 Takahashi .............. H04B 10/11
                                             398/128
5,528,409 A   6/1996 Cucci et al.
(Continued)

FOREIGN PATENT DOCUMENTS

JP        2015104059 A * 6/2015
WO        2017176413 A1   10/2017

OTHER PUBLICATIONS

Machine translation of JP-2015104059-A (Year: 2015).*
(Continued)

*Primary Examiner* — Kevin M Burd
(74) *Attorney, Agent, or Firm* — Brake Hughes Bellermann LLP

(57)            ABSTRACT

A power adapter can include a power input node, a communication channel node, an output node, a low-pass filter, a modulator, and a high-pass filter. The low-pass filter can include a low-pass input node coupled to the power input node and a low-pass output node coupled to the output node. The modulator can include a modulator input node coupled to the communication channel node and a modulator output node. The modulator can be configured to modulate data received from the communication channel node onto a signal having a higher frequency than a data-carrying signal carrying the data received from the communication channel node and output the modulated data to a high-pass input node of a high-pass filter. The high-pass filter can include the high-pass input node coupled to the modulator output node and a high-pass output node coupled to the output node.

9 Claims, 5 Drawing Sheets

(58) Field of Classification Search
    USPC .......................................................... 375/257
    See application file for complete search history.

(56)                    References Cited

U.S. PATENT DOCUMENTS

| | | | |
|---|---|---|---|
| 5,777,769 A * | 7/1998 | Coutinho ................. | H04B 3/56 |
| | | | 398/171 |
| 7,359,647 B1 | 4/2008 | Faria et al. | |
| 10,809,304 B1 * | 10/2020 | Larson ................. | G01R 31/389 |
| 2015/0054524 A1 * | 2/2015 | Kobayashi ......... | G01R 31/1227 |
| | | | 324/551 |
| 2016/0004650 A1 * | 1/2016 | Yamasaki ............... | G06F 1/266 |
| | | | 710/63 |
| 2020/0053606 A1 * | 2/2020 | Jung ................. | H04W 36/0044 |

OTHER PUBLICATIONS

International Search Report and Written Opinion for PCT Application No. PCT/US2021/070222, mailed on Nov. 17, 2021, 11 pages.
"USB Type-C Power Delivery Using STM32 MCUS and MPUS", ST; AN5225—Rev 3; www.st.com, 2020, 64 pages.
Rogers, "Introduction to USB Type-C™", Microchip AN1953; DS00001953A, 2015, 20 pages.

* cited by examiner

POWER ADAPTER THAT COMBINES POWER INPUT AND COMMUNICATION INPUT

CROSS REFERENCE TO RELATED APPLICATION

This application is a 35 U.S.C. § 371 National Phase Entry Application from PCT/US2021/070222, filed Mar. 3, 2021, designating the U.S., the disclosure of which is incorporated herein by reference in its entirety.

TECHNICAL FIELD

This description relates to charging electronic devices.

BACKGROUND

Small electronic devices can have limited space. Multiple input pins can exceed the space constraints of these small electronic devices.

SUMMARY

A power adapter can include a power input node, a communication channel node, an output node, a low-pass filter, a modulator, and a high-pass filter. The low-pass filter can include a low-pass input node coupled to the power input node and a low-pass output node coupled to the output nod. The modulator can include a modulator input node coupled to the communication channel node and a modulator output node. The modulator can be configured to modulate data received from the communication channel node onto a signal having a higher frequency than a data-carrying signal carrying the data received from the communication channel node and output the modulated data to a high-pass input node of a high-pass filter. The high-pass filter can include the high-pass input node coupled to the modulator output node and a high-pass output node coupled to the output node.

In some examples, the output node can receive and/or combine the signals outputted by the low-pass filter and the high-pass filter.

In some examples, the power adapter can further include a signal generator configured to generate and output, to the output node, a signal indicating a current capacity of the power adapter.

In some examples, the power adapter can further include a signal generator configured to generate and output, to the high-pass input node of the high-pass filter, a signal indicating a current capacity of the power adapter.

In some examples, the communication channel node can include a first communication channel node, and the power adapter can include a second communication channel node coupled to the modulator input node.

In some examples, the power adapter can further include an encoder configured to encode data received from the communication channel node and output the encoded data to the modulator.

In some examples, the encoder can be configured to continue encoding data received from the communication channel node until the encoder has stopped receiving data from the communication channel node for a predetermined time.

In some examples, the power adapter can further include a decoder configured to decode data received from the modulator and output the decoded data to the communication channel node.

In some examples, the decoder can be configured to continue decoding data received from the modulator until the decoder has stopped receiving data from the modulator for a predetermined time.

In some examples, the modulator can be further configured to demodulate data received from the high-pass input node and output the demodulated data to the communication channel node.

In some examples, the modulator can be configured to send and receive data according to a half-duplex communication system.

In some examples, the power adapter can further include a ground input node, and a ground output node, the ground output node being coupled to the ground input node.

An electronic device can include an input node, a low-pass filter, the low-pass filter comprising a low-pass input node coupled to the input node and a low-pass output node, a high-pass filter, the high-pass filter comprising a high-pass input node coupled to the input node and a high-pass output node, and a demodulator, the demodulator comprising a demodulator input node coupled to the high-pass output node and a demodulator output node, the demodulator being configured to extract coded data from a signal received from the high-pass filter.

In some examples, the input node can be configured to receive a combined signal from an output node of a power adapter, the combined signal originating from power input and communication signals received at the power adapter.

In some examples, the electronic device can further include a decoder. The decoder can include an input node coupled to the demodulator output node, the decoder being configured to decode data received from the demodulator.

In some examples, the decoder can be configured to continue decoding data received from the input node until the decoder has stopped receiving data from the input node for a predetermined time.

In some examples, the electronic device can further include a rechargeable battery coupled to the low-pass output node.

In some examples, the electronic device can further include a ground node coupled to the rechargeable battery.

In some examples, the electronic device can further include a signal processor configured to process a signal indicating a current capacity of a device sending signals to the electronic device.

A system can include a power adapter and an electronic device. The power adapter can include a power input node, a communication channel node, an output node, a low-pass filter, a modulator, and a high-pass filter. The low-pass filter can include a low-pass input node coupled to the power input node and a low-pass output node coupled to the output nod. The modulator can include a modulator input node coupled to the communication channel node and a modulator output node. The modulator can be configured to modulate data received from the communication channel node onto a signal having a higher frequency than a data-carrying signal carrying the data received from the communication channel node and output the modulated data to a high-pass input node of a high-pass filter. The high-pass filter can include the high-pass input node coupled to the modulator output node and a high-pass output node coupled to the output node. The electronic device can include an input node coupled to the output node, a low-pass filter, the low-pass filter comprising a low-pass input node coupled to the input node and a low-pass output node, a high-pass filter, the high-pass filter comprising a high-pass input node coupled to the input node and a high-pass output node, and a demodulator, the demodulator comprising a demodulator input node coupled to the high-pass output node and a demodulator output node, the demodulator being configured to extract coded data from a signal received from the high-pass filter.

In some examples, the power adapter can further include a ground output node, and the electronic device can further include a ground input node. The ground input node can be coupled to the ground output node.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

A power adapter combines the signals of two nodes, a power input node and a communication channel node, and outputs the combined signal on a single output node. An electronic device with limited space, such as a watch, glasses or smartglasses, or earbuds, receives the combined signal and extracts the separate signals that had been separately received by the power input node and the communication channel node. As used herein, a "node" can also refer to a pin.

The power adapter can combine the signals by passing the input from the power input node through a low-pass filter, modulating the signal received from the communication channel node onto a higher frequency signal, passing the modulated signal through a high-pass filter, and combining the output from the low-pass filter and the high-pass filter as the combined signal. The electronic device can split the combined signal into two signal portions. The electronic device can pass a first signal portion of the combined signal through a low-pass filter, which will extract the signal that the power adapter received from the power node, and pass the signal to a rechargeable battery. The low-pass filter can pass signals, such as the power signals originating from the power input node of the power adapter, from the low-pass filter to a charger and/or a rechargeable battery. The electronic device can pass a second signal portion of the combined signal through a high-pass filter, and pass the output of the high-pass filter to a demodulator, which will extract the original signal received by the communication channel node of the power adapter. The high-pass filter can pass the filtered signal, which can be based on signals received by the communication channel node(s) of the power adapter, to a controller included in the electronic device. The power adapter can thereby send both a power signal and a communication signal to the electronic device via a single node, and the electronic device can extract both the power signal and the communication signal that the electronic device receives via a single node. The single node can save space on the electronic device compared to multiple nodes.

Figure 1:
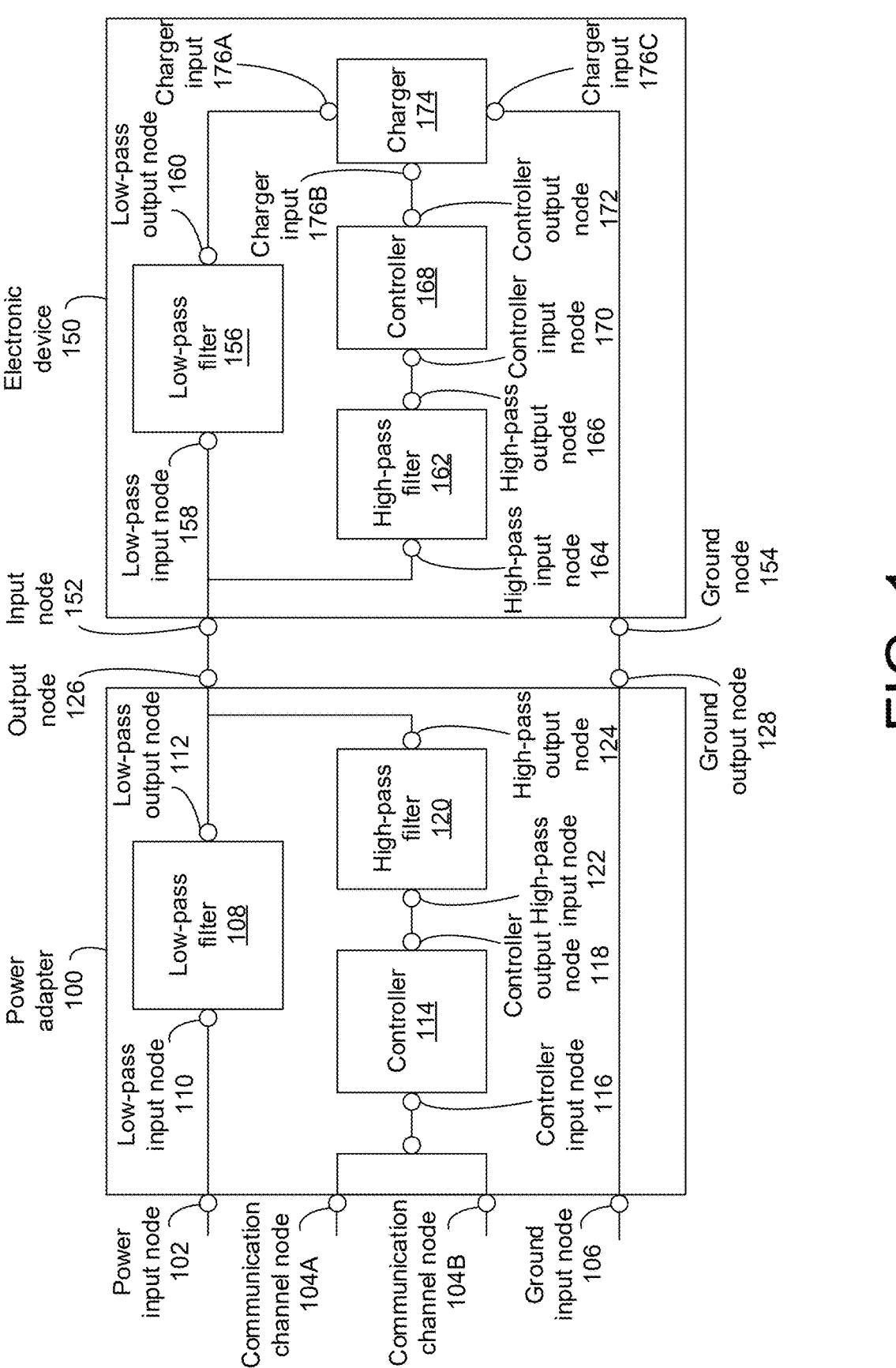
FIG. 1 is a diagram showing a power adapter and an electronic device.

FIG. 1 is a diagram showing a power adapter 100 and an electronic device 150. The power adapter 100 can receive a power signal via a power input node 102 and a communication signal via one or more communication channel nodes 104A, 104B, combine the power signal and communication signal, and send the combined signal to the electronic device 150 via an output node 126.

The power adapter 100 can couple to a charging device, such as a Universal Serial Bus (USB) Type-C charger. This is merely an example, and the power adapter 100 can also couple to other types of charging devices. The power adapter 100 can include the power input node 102, the one or more communication channel nodes 104A, 104B, and a ground input node 106.

The power input node 102 can receive power input, such as twenty volts (20 V) at three amperes (3 A) in one example. In other examples, the power input can be five volts (5 V) at one hundred milliamperes (100 mA) or one hundred fifty milliamperes (150 mA). The power input node 102 can receive the power input from a charger, such as a USB Type-C charger. The power input node 102 can pass and/or output the power input to a low-pass filter 108.

The power adapter can include the low-pass filter 108. The low-pass filter 108 can allow low-frequency signals to pass through the low-pass filter 108, and/or filter out and/or block high-frequency signals. In some examples, the low-pass filter 108 can pass signals with frequencies below, and/or block signals with frequencies above, approximately one Gigahertz (1 GHz). In some examples, the low-pass filter 108 can pass signals with frequencies below, and/or block signals with frequencies above, approximately one hundred Megahertz (100 MHz).

The low-pass filter 108 can include a low-pass input node 110. The low-pass input node 110 can be coupled to the power input node 102. The low-pass filter 108 can include a low-pass output node 112. The low-pass output node 112 can be coupled to an output node 126 of the power adapter 100, and to a high-pass output node 124 included in a high-pass filter 120 of the power adapter 100. The coupling of the low-pass output node 112 to the high-pass output node 124 can combine the power input signal received by the power input node 102 of the power adapter 100 with the communication signal.

The power adapter 100 can include the one or more communication channel nodes 104A, 104B. In some examples, the power adapter can include only one of the communication channel nodes 104A, 104B. In some examples, the communication channel node 104A can be considered a first communication channel node coupled to the controller input node 116 and/or modulator input node 210, and the communication channel node 104B can be considered a second communication channel node coupled to the controller input node 116 and/or modulator input node 210. In some examples, the power adapter 100 includes two differential communication channel nodes 104A, 104B. The communication channel node(s) 104A, 104B can pass a communication signal(s) received from the USB Type-C charger to a controller 114. In some examples, the communication channel node(s) 104A, 104B can transmit communication signals in a half-duplex mode and/or half-duplex communication system at approximately 300 kilobits per second (300 Kbit/s). In some examples, the communication protocol can include bi-phase mark code (BMC), encoding 32-bit words and/or 4B5B encoding. In some examples, a controller 114 can sample the data at a frequency of at least twice the frequency of the communication signals.

The power adapter 100 can include the controller 114. The controller 114 can modulate the signal received from the communication channel node(s) 104A, 104B. The controller 114 can modulate the signal onto a higher-frequency signal than the frequency of the communication signal, which can be considered a data-carrying signal, received from the communication channel node(s) 104A, 104B. The controller 114 can modulate the signal using any of a variety of modulation techniques, such as amplitude modulation (AM) or frequency modulation (FM), as non-limiting examples. In some examples, the controller 114 can include a programmable logic controller (PLC).

Figure 2:
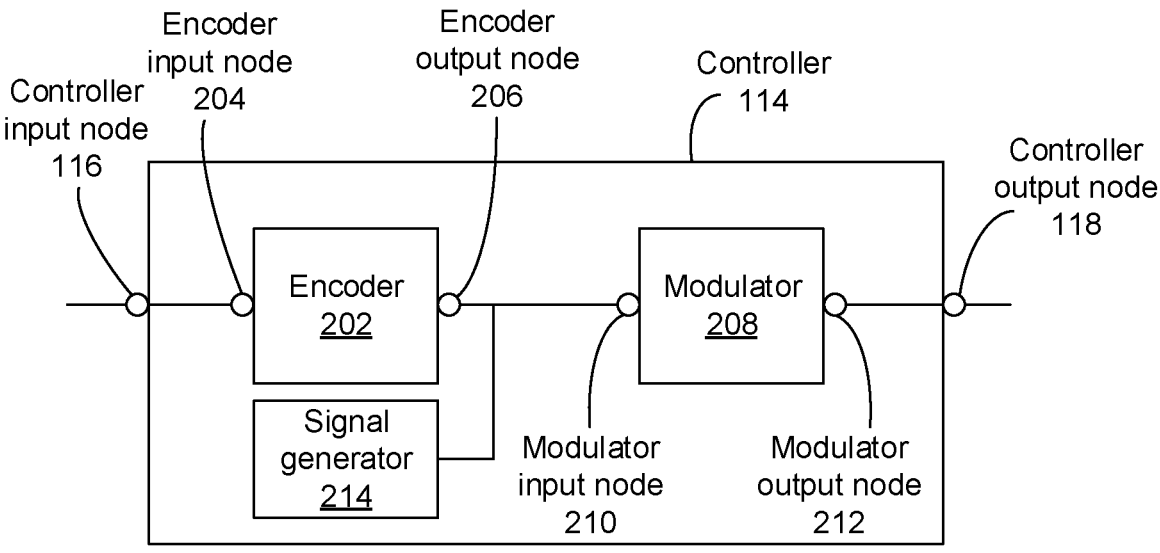
FIG. 2 is a diagram showing a controller included in the power adapter.

The controller 114 can include a controller input node 116. The controller 114 can receive the communication signal and/or data from the communication channel node(s) 104A, 104B via the controller input node 116. The controller 114 can include a controller output node 118. The controller 114 can pass and/or output the modulated data to the high-pass filter 120 via the controller output node 118. FIG. 2 shows the controller 114 in greater detail.

FIG. 2 is a diagram showing the controller 114 included in the power adapter 100. The controller 114 can include an encoder 202. The encoder 202 can encode data received by the controller 114. The encoder 202 can, for example, encode data received by the controller 114 and encoded according to a first encoding scheme, such as twenty-four Megahertz (24 Hz) binary frequency shift keying (BFSK), into another format that is easier to modulate onto a higher-frequency signal. The encoder 202 can include an encoder input node 204 that receives the communication signal and/or data signal from the controller input node 116. The encoder 202 can include an encoder output node 206 that sends the encoded signal to a modulator 208 included in the controller 114.

The controller 114 can include the modulator 208. The modulator 208 can modulate the signal encoded by the encoder 202 onto a higher frequency signal. The modulation of the signal encoded by the encoder 202 onto a higher frequency signal can ensure that the signal received by the power adapter 100 via the communication channel node(s) 104A, 104B does not interfere with the signal received by the power adapter 100 via the power input node 102. The modulator 208 can include a modulator input node 210. The modulator input node 210 can receive the encoded data and/or encoded signal from the encoder output node 206 of the encoder 202. The modulator 208 can include a modulator output node 212. The modulator output node 212 can send the modulated data and/or modulated signal to the controller output node 118. In some examples, the modulator 208 can also demodulate data received from the high-pass input node 122 and output the demodulated data to the communication channel node(s) 104A, 104B.

The controller 114 can include a signal generator 214. In some examples, the controller 114 can sense and/or determine a pullup resistor value, such as a voltage across a resistor included in the controller 114 and/or power adapter 100, which can indicate a current capacity of the power adapter 100. After the controller 114 senses and/or determines the value of the pullup resistor and/or the current capacity, a signal generator 214 included in the controller 114 can send the value, and/or a signal indicating the value, to the controller 168 included in the electronic device 150 via the modulator 208, and/or to the high-pass input node 122 of the high-pass filter 120. The value and/or signal sent by the signal generator 214 included in the controller 114 to the controller 168 can indicate the current capacity of the power adapter 100.

Returning to FIG. 1, the power adapter 100 can include the high-pass filter 120. The high-pass filter 120 can pass high-frequency signals, and/or block low-pass frequency signals. The threshold frequency for passing and/or blocking signals by the high-pass filter 120 can be equal to or greater than the threshold frequency for passing and/or blocking signals by the low-pass filter 108. In some examples, the high-pass filter 120 can pass signals with frequencies above, and/or block signals with frequencies below, approximately one Gigahertz (1 GHz). In some examples, the high-pass filter 120 can pass signals with frequencies above, and/or block signals with frequencies below, approximately one hundred Megahertz (100 MHz).

The high-pass filter 120 can include a high-pass input node 122. The high-pass input node 122 can receive the encoded signals and/or encoded data from the controller output node 118. The high-pass filter 120 can include a high-pass output node 124. The high-pass output node 124 can pass the modulated data and/or modulated signals to the output node 126 of the power adapter 100.

The power adapter 100 can include the output node 126. The output node 126 can receive and/or combine the signals outputted by the low-pass filter 108 and the high-pass filter 120. The output node 126 can output the combined signal to the electronic device 150.

In some examples, the power adapter 100 can include a ground input node 106. The ground input node 106 can couple to a ground node of the charging device, such as a USB Type-C charger. The power adapter 100 can include a ground output node 128. The ground input node 106 can be coupled to the ground output node 128.

The electronic device 150 can include an input node 152. The input node 152 can receive the combined signal from the output node 126 of the power adapter 100. The input node 152 can pass and/or output the combined signal to a low-pass filter 156 included in the electronic device 150 and to a high-pass filter 162 included in the electronic device 150.

The electronic device 150 can include the low-pass filter 156. The low-pass filter 156 can include a low-pass input node 158. The low-pass input node 158 can receive the combined signal from the input node 152 on behalf of the low-pass filter 156. The low-pass filter 156 can allow low-frequency signals, such as signals below a low-frequency threshold, to pass through the low-pass filter 156, and/or filter out and/or block high-frequency signals, such as signals above the low-frequency threshold. The low-frequency threshold for the low-pass filter 156 to pass and/or block signals can be the same as, and/or near, the frequency threshold at which the low-pass filter 108 included in the power adapter 100 passes and/or blocks signals. The low-pass filter 156 can include a low-pass output node 160. The low-pass output node 160 can pass signals, such as the power signals originating from the power input node 102, from the low-pass filter to a charger 174 and/or a rechargeable battery. In this manner, the power signals originating from the power input node 102 can provide power to, and/or recharge, the charger 174 and/or rechargeable battery.

The electronic device 150 can include the high-pass filter 162. The high-pass filter 162 can allow high-frequency signals, such as signals above a high-frequency threshold, and/or block low-frequency signals, such as signals below the high-frequency threshold. The high-frequency threshold for the high-pass filter 162 can be the same as a frequency threshold for the high-pass filter 120 included in the power adapter 100. The high-pass filter 162 can pass the filtered signal, which can be based on signals received by the communication channel(s) node 104A, 104B, to a controller 168. The high-pass filter 162 can include a high-pass output node 166. The high-pass output node 166 can pass and/or output the filtered signal from the high-pass filter 162 to the controller 168.

The electronic device 150 can include the controller 168. The controller 168 can demodulate the filtered signal that the controller 168 receives from the high-pass filter 162. The controller 168 can demodulate the filtered signal to a lower-frequency signal that still carries the information included in the filtered signal. In some examples, the controller 168 can include a programmable logic controller (PLC).

Figure 3:
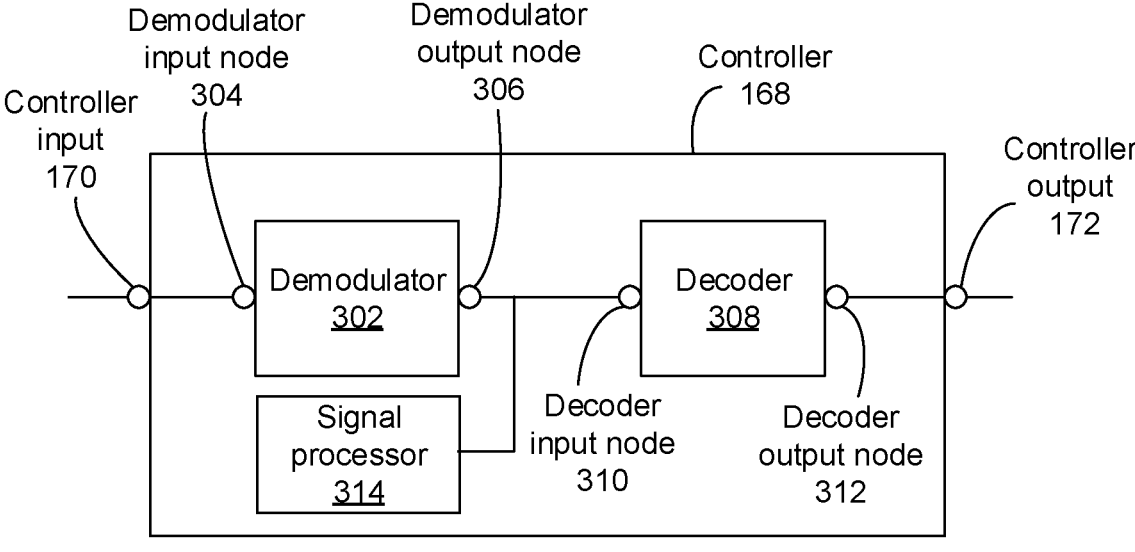
FIG. 3 is a diagram showing a controller included in the electronic device.

The controller 168 can include a controller input 170. The controller input 170 can receive the filtered signal from the high-pass output node 166. The controller 168 can include a controller output 172. The controller output 172 can output the demodulated signal to a charger 174 or other device(s) that processes the demodulated signal. FIG. 3 shows the controller 168 in greater detail.

FIG. 3 is a diagram showing the controller 168 included in the electronic device 150. The controller 168 can include a demodulator 302. The demodulator 302 can demodulate the filtered signal, as discussed above with respect to the controller 168. The demodulator 302 can extract coded data from a signal received from the high-pass filter 162, such as by demodulating the signal on which the data are encoded. The demodulator 302 can include a demodulator input node 304. The demodulator input node 304 can receive the filtered signal from the controller input 170. The demodulator 302 can include a demodulator output node 306. The demodulator output node 306 can pass the demodulated signal to a decoder 308.

The controller 168 can include a signal processor 314. The signal processor 314 can process a signal, generated by the signal generator 214 included in the controller 114, indicating a current capacity of the power adapter 100, which can be considered a device sending signals to the electronic device 150.

The controller 168 can include the decoder 308. The decoder 308 can decode the demodulated data into a code and/or format that can be processed and/or interpreted by the charger 174 or other device that receives the demodulated and/or decoded signal from the controller 168. The decoder 308 can include a decoder input node 310. The decoder input node 310 can receive the demodulated signal from the demodulator 302. In some examples, the decoder 308 can continue decoding data received from the modulator 208 until the decoder 308 has stopped receiving data from the modulator 208 for a predetermined time. The decoder 308 can include a decoder output node 312. The decoder output node 312 can send and/or output the decoded data to the controller output 172.

The electronic device 150 can include the charger 174. The charger 174 can include a rechargeable battery that recharges from the power signal received by the electronic device 150 via the input node 152 and low-pass filter 156. In some examples, the charger 174 can also include a processor and/or memory that processes and/or stores data received by the electronic device 150 via the input node 152, the high-pass filter 162, and the controller 168.

In some examples, the electronic device 150 can include a ground node 154. The ground node 154 can be coupled to the ground output node 128 to couple the ground node 154 and/or electronic device 150 to ground. The ground node 154 can be coupled to the charger 174 to ground the charger 174.

Figure 4:
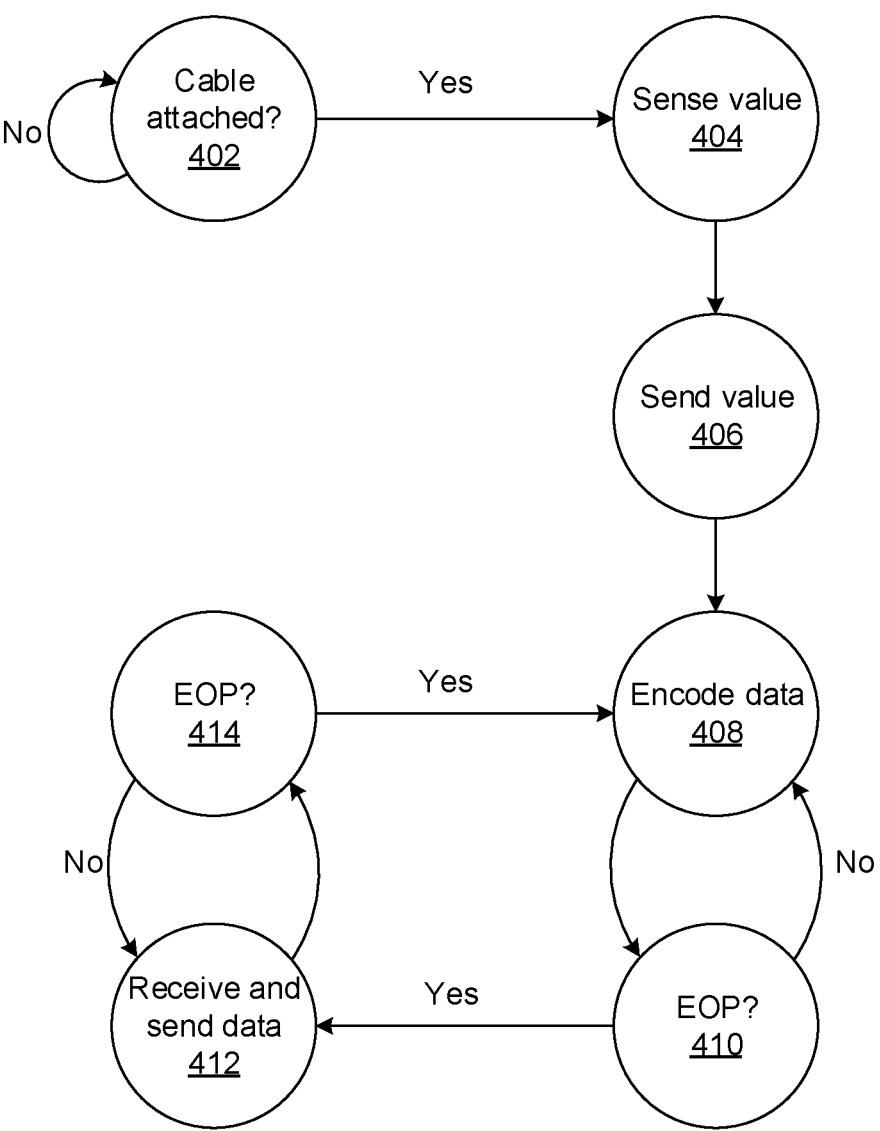
FIG. 4 is a state machine diagram showing states of, and operations performed by, the controller shown in FIG. 2.

FIG. 4 is a state machine diagram showing states of, and operations performed by, the controller 114 shown in FIG. 2. The controller 114 can determine whether a cable is attached (402) to the power adapter 100. If the controller 114 determines that a cable is not attached, then the controller 114 can remain in an inactive state, except for determining whether a cable is attached (402).

If the controller 114 determines that the cable is attached, then the controller 114 can sense and/or determine a value (404). In some examples, the controller 114 can sense and/or determine a pullup resistor value, such as a voltage across a resistor, which can indicate a current capacity of the power adapter 100. After sensing the value (404), the power adapter 100 can send the value (406) and/or signal to the controller 168 included in the electronic device 150. The value and/or signal sent by the controller 114 to the controller 168 can indicate the current capacity of the power adapter 100.

After sending the value (406) and/or signal to the controller 168, the controller 114 can encode the data (408) received from the communication channel node(s) 104A, 104B. Encoding the data (408) can include changing an encoding format of the data and/or modulating the data onto a carrier wave with a higher frequency than a frequency of the data received from the communication channel node(s) 104A, 104B. The controller 114 can also send the encoded data to the controller 168 via the high-pass filter 120 included in the power adapter 100 and the high-pass filter 162 included in the electronic device 150.

After encoding and sending the data (408), the controller 114 can determine whether encoding and sending the data (408) is the end of the program (410). The controller 114 can determine that the program has ended if the controller 114 has stopped receiving data and/or signals, and/or if a predetermined period of time, such as ten milliseconds (10 ms), has passed without receiving any signals from the communication channel node(s) 104A, 104B. If the controller 114 has received data within the previous predetermined period of time and/or the program has not ended, then the controller 114 can continue encoding and sending data (408).

If the controller 114 determines that no data have been received within the predetermined time and/or that the program has ended, then the encoder 202 can receive data from the controller 168 and send the data (412) via the communication channel node(s) 104A, 104B. The controller 114 can receive the data from the controller 168 via the high-pass filter 162 and the high-pass filter 120. The controller 114 can decode and/or demodulate the data received from the controller 168, and send the decoded and/or demodulated data to the communication channel node(s) 104A, 104B.

After receiving and sending the data (412), the controller 114 can determine whether encoding and sending the data (412) is the end of the program (414). The controller 114 can determine that the program has ended if the controller 114 has stopped receiving signals and/or data, and/or if a predetermined period of time, such as ten milliseconds (10 ms), has passed without receiving any signals from the controller 168. If the controller 114 has received data within the previous predetermined period of time and/or the program has not ended, then the controller 114 can continue receiving and sending data (412). If the controller 114 determines that the program has ended, then the controller 114 can resume encoding data received from the communication channel node(s) 104A, 104B and sending the data (408) to the controller 114. The alternating between sending data to the controller 168 (408) and receiving data from the controller 168 (412) can be part of a half-duplex communication protocol and/or system.

Figure 5:
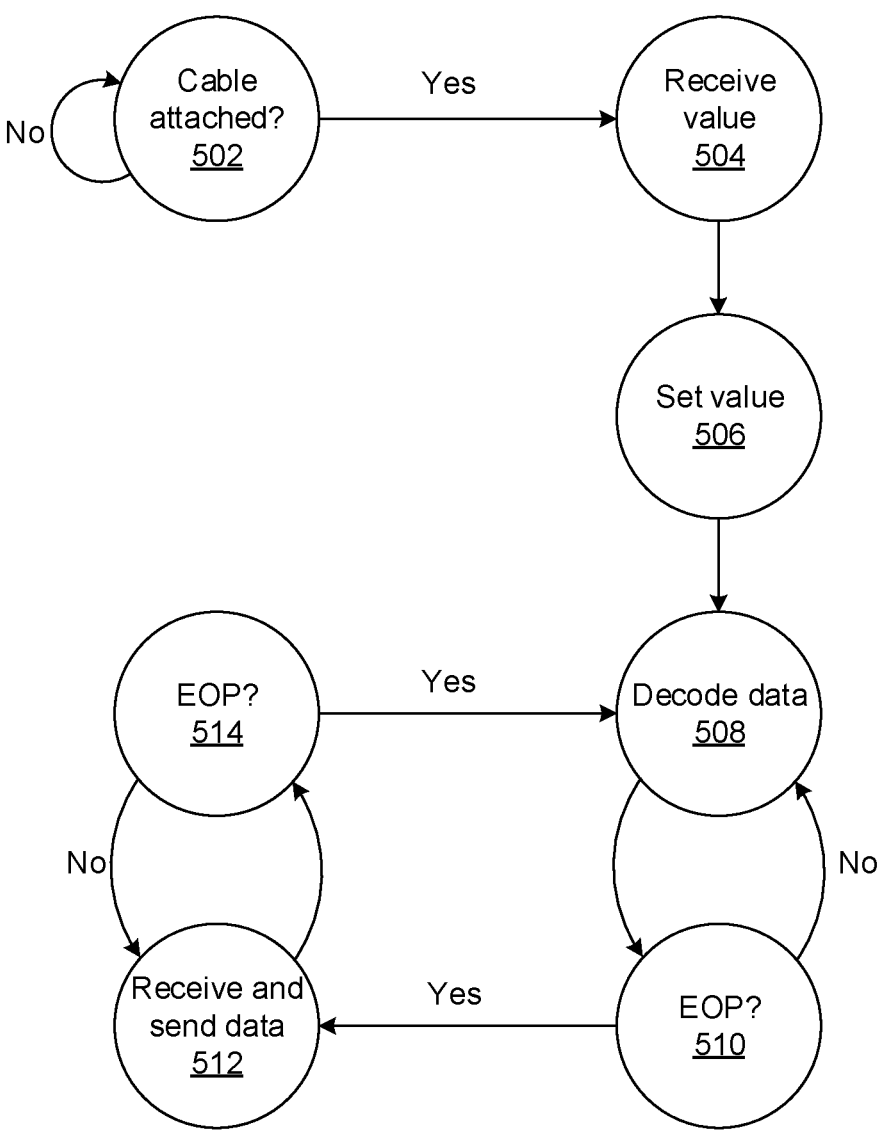
FIG. 5 is a state machine diagram showing states of, and operations performed by, the controller shown in FIG. 3.

FIG. 5 is a state machine diagram showing states of, and operations performed by, the controller 168 shown in FIG. 3. The controller 168 can determine whether a cable is attached (502) to the electronic device 150. If the controller 168 determines that a cable is not attached, then the controller 168 can remain in an inactive state, except for determining whether a cable is attached (502).

If the controller 168 determines that the cable is attached, then the controller 168 can receive a value (504) from the controller 114. The received value can be the value that the controller 114 sensed (404) and sent (406) to the controller 168. In some examples, the controller 168 can act as, and/or include, the signal processor 314 that processes a signal received from the controller 114 indicating a current capacity of the power adapter 100 and/or the device sending signals to the electronic device 150. After receiving the value (504), the electronic device 150 can set the value (506) for communication and/or data signals received and/or sent by the electronic device 150. The value and/or signal can indicate the current capacity of the power adapter 100.

After setting the value (506), the controller 168 can decode the data (508) received from the power adapter 100 via the high-pass filter 162. Decoding the data (508) can include changing an encoding format of the data and/or demodulating the data from a carrier wave with a higher frequency than the demodulated data. The controller 168 can also send the decoded data to a processor included in the electronic device 150.

After decoding the data (508), the controller 168 can determine whether decoding the data (508) is the end of the program (510). The controller 168 can determine that the program has ended if the controller 168 has stopped receiving signals and/or data, and/or if a predetermined period of time, such as ten milliseconds (10 ms), has passed without receiving any signals from the power adapter 100 and/or high-pass filter 162. If the controller 168 has received data within the previous predetermined period of time and/or the program has not ended, then the controller 168 can continue decoding data (508).

If the controller 168 determines that no data have been received within the predetermined time and/or that the program has ended, then the decoder 308 can receive data from the charger 174 and/or other device such as a processor and send the data to the power adapter 100 via the high-pass filter 162. The controller 168 can encode and/or modulate the data received from the charger 174 and/or processor, and send the encoded and/or modulated data to the power adapter 100 via the high-pass filter 162.

After receiving and sending the data (512), the controller 168 can determine whether encoding and sending the data (512) is the end of the program (514). The controller 168 can determine that the program has ended if the controller 168 has stopped receiving signals and/or data, and/or if a predetermined period of time, such as ten milliseconds (10 ms), has passed without receiving any signals from the charger 174 and/or processor. If the controller 168 has received data within the previous predetermined period of time and/or the program has not ended, then the controller 168 can continue receiving and sending data (512). If the controller 168 determines that the program has ended, then the controller 168 can resume decoding data (508) received from the power adapter 100 via the high-pass filter 162. The alternating between decoding data (508) and sending data (512) can be part of a half-duplex communication protocol and/or system.

Figure 6:
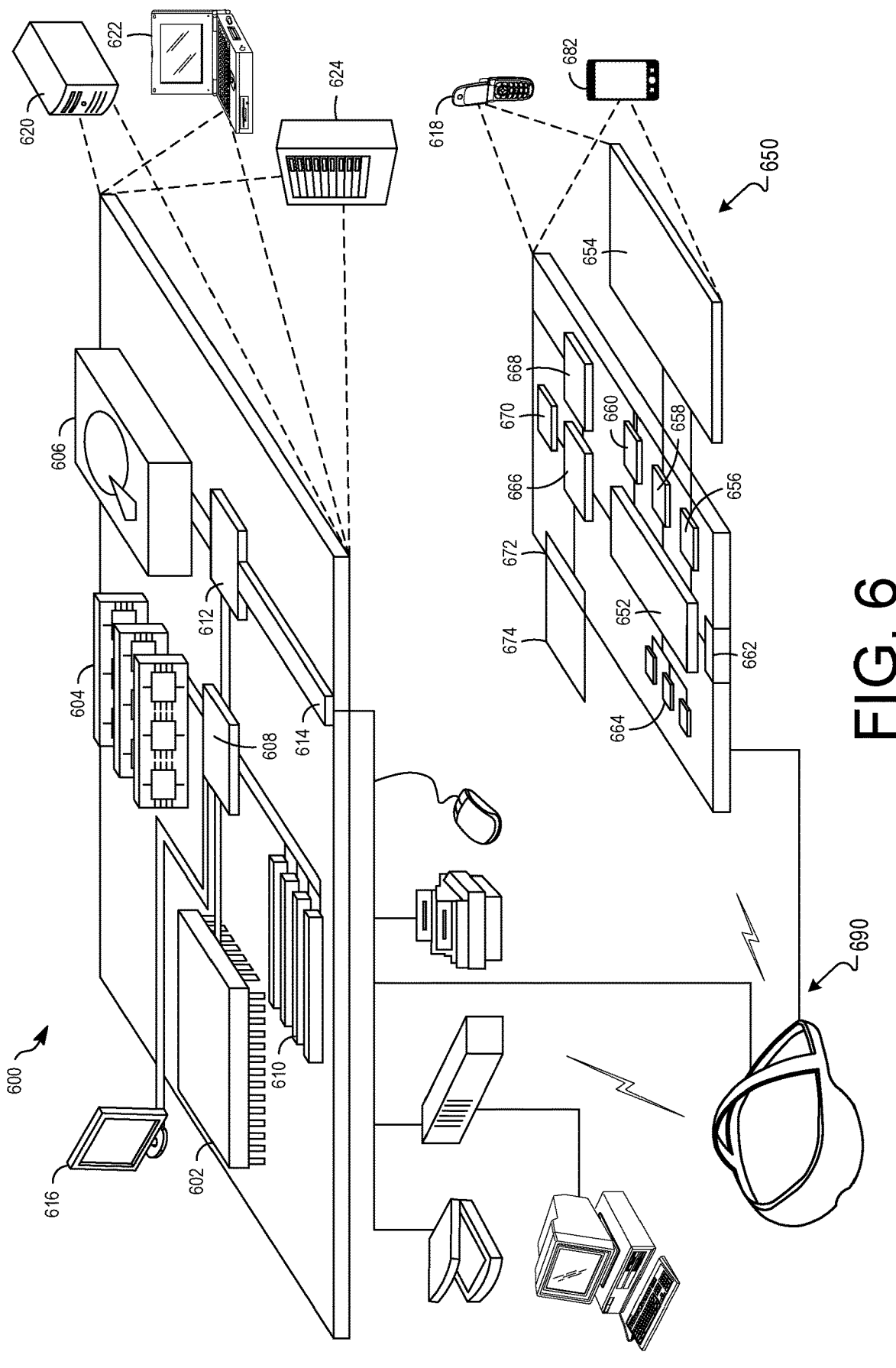
FIG. 6 shows an example of a computer device and a mobile computer device that can be used to implement the techniques described here.

FIG. 6 shows an example of a computer device and a mobile computer device that may include the power adapter 100 and/or the electronic device 150 described here. FIG. 6 shows an example of a generic computer device 600 and a generic mobile computer device 650, which may be used with the power adapter 100 described here. Computing device 600 is intended to represent various forms of digital computers, such as laptops, desktops, tablets, workstations, personal digital assistants, televisions, servers, blade servers, mainframes, and other appropriate computing devices. Computing device 650 is intended to represent various forms of mobile devices, such as personal digital assistants, cellular telephones, smart phones, and other similar computing devices, and can be an example of the electronic device 150. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. The processor 602 can be a semiconductor-based processor. The memory 604 can be a semiconductor-based memory. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate, including using the power adapter 100.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 618. It may also be implemented as part of a smart phone 682, personal digital assistant, or other similar mobile device.

In some implementations, the computing devices depicted in FIG. 6 can include sensors that interface with a virtual and/or augmented reality (VR/AR) headset 690 and/or smartglasses. The VR/AR headset 690 may include smart eyewear or smart glasses. Smart eyewear are glasses (or smart glasses) that add information alongside what the wearer sees through the glasses. Superimposing information (e.g., digital images) onto a field of view may be achieved through smart optics such as an optical head-mounted display (OHMD), or embedded wireless glasses with a transparent heads-up display (HUD), or augmented reality (AR) overlay. Modern smart eyewear are effectively wearable computers which can run self-contained mobile apps. Some may be handsfree and can communicate with the Internet via natural language voice commands, while others may use touch buttons. Smart eyewear typically includes electronic components disposed in the eyewear. For example, electronic components may be additionally disposed in one or both of the temples. The smart glasses and its included electronic components may use connectors such as power adapter 100.

Furthermore, one or more sensors included on a computing device 650 or other computing device depicted in FIG. 6, can provide input to VR headset 690 (and/or smartglasses) or in general, provide input to a VR space. The sensors can include, but are not limited to, a touchscreen, accelerometers, gyroscopes, pressure sensors, biometric sensors, temperature sensors, humidity sensors, and ambient light sensors. The computing device 650 can use the sensors to determine an absolute position and/or a detected rotation of the computing device in the VR space that can then be used as input to the VR space. For example, the computing device 650 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 650 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 650 when the computing device is incorporated into the VR space can cause a particular action to occur in the VR space.

In some implementations, a touchscreen of the computing device 650 can be rendered as a touchpad in VR space. A user can interact with the touchscreen of the computing device 650. The interactions are rendered, in VR headset 690 for example, as movements on the rendered touchpad in the VR space. The rendered movements can control objects in the VR space.

In some implementations, one or more output devices included on the computing device 650 can provide output and/or feedback to a user of the VR headset 690 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 650 may appear as another object in a computer-generated, 3D environment. Interactions by the user with the computing device 650 (e.g., rotating, shaking, touching a touchscreen, swiping a finger across a touch screen) can be interpreted as interactions with the object in the VR space. In the example of the laser pointer in a VR space, the computing device 650 appears as a virtual laser pointer in the computer-generated, 3D environment. As the user manipulates the computing device 650, the user in the VR space sees movement of the laser pointer. The user receives feedback from interactions with the computing device 650 in the VR space on the computing device 650 or on the VR headset 690.

A number of embodiments have been described. Nevertheless, it will be understood that various modifications may be made without departing from the spirit and scope of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. An electronic device comprising:

an input node;

a low-pass filter, the low-pass filter comprising a low-pass input node coupled to the input node and a low-pass output node coupled to a rechargeable battery, the low-pass filter being configured to pass power signals originating from the input node to the rechargeable battery;

a high-pass filter, the high-pass filter comprising a high-pass input node coupled to the input node and a high-pass output node;

a demodulator, the demodulator comprising a demodulator input node coupled to the high-pass output node and a demodulator output node, the demodulator being configured to extract coded data from a signal received from the high-pass filter; and the rechargeable battery, the rechargeable battery being configured to recharge from the power signals originating from the input node.

2. The electronic device of claim 1, wherein the input node is configured to receive a combined signal from an output node of a power adapter, the combined signal originating from power input and communication signals received at the power adapter.

3. The electronic device of claim 1, further comprising a decoder, the decoder comprising an input node coupled to the demodulator output node, the decoder being configured to decode data received from the demodulator.

4. The electronic device of claim 3, wherein the decoder is configured to continue decoding data received from the input node until the decoder has stopped receiving data from the input node for a predetermined time.

5. The electronic device of claim 1, further comprising a ground node coupled to the rechargeable battery.

6. The electronic device of claim 1, further comprising a signal processor configured to process a signal indicating a current capacity of a device sending signals to the electronic device.

7. A system comprising:

a power adapter comprising:

a power input node configured to receive a power signal from a charging device;

a communication channel node configured to receive a data signal from the charging device;

an output node;

a first low-pass filter, the first low-pass filter comprising a first low-pass input node coupled to the power input node and a first low-pass output node coupled to the output node;

a modulator, the modulator comprising a modulator input node coupled to the communication channel node and a modulator output node, the modulator being configured to:

modulate the data signal received from the communication channel node onto a modulated signal, the modulated signal having a higher frequency than the data signal; and output the modulated signal to a first high-pass input node of a first high-pass filter; and the first high-pass filter, the first high-pass filter comprising the first high-pass input node coupled to the modulator output node and a first high-pass output node coupled to the output node; and an electronic device comprising:

an input node coupled to the output node, the input node being configured to receive the power signal and the data signal from the output node;

a second low-pass filter, the second low-pass filter comprising a second low-pass input node coupled to the input node and a second low-pass output node coupled to a rechargeable battery, the second low-pass filter being configured to pass the power signal originating from the input node to a rechargeable battery;

a second high-pass filter, the second high-pass filter comprising a second high-pass input node coupled to the input node and a second high-pass output node;

a demodulator, the demodulator comprising a demodulator input node coupled to the second high-pass output node and a demodulator output node, the demodulator being configured to extract coded data from a signal received from the second high-pass filter; and the rechargeable battery, the rechargeable battery being configured to recharge from the power signal passed by the second low-pass filter.

8. The system of claim 7, wherein:

the power adapter further comprises a ground output node; and the electronic device further comprises a ground input node, the ground input node being coupled to the ground output node.

9. The system of claim 7, wherein the charging device is a Universal Serial Bus (USB) Type-C charger.

* * * * *